United States Patent
Kakaraparthi (10) Patent No.: US 10,567,548 B2
(45) Date of Patent: Feb. 18, 2020

(54) SYSTEM AND METHOD FOR DETERMINING SERVICE PRIORITIZATION IN VIRTUAL DESKTOP INFRASTRUCTURE

(71) Applicant: Wipro Limited, Bangalore (IN)

(72) Inventor: Narasimha Sekhar Kakaraparthi, Hyderabad (IN)

(73) Assignee: Wipro Limited, Bangalore (IN)

( * ) Notice: Subject to any disclaimer, the term of this patent is extended or adjusted under 35 U.S.C. 154(b) by 319 days.

(21) Appl. No.: 15/461,862

(22) Filed: Mar. 17, 2017

(65) Prior Publication Data

US 2018/0213061 A1    Jul. 26, 2018

(30) Foreign Application Priority Data

Jan. 25, 2017  (IN) .............................. 201741002952

(51) Int. Cl.
*G06F 15/173* (2006.01)
*H04L 29/08* (2006.01)

(52) U.S. Cl.
CPC ........ *H04L 67/322* (2013.01); *H04L 67/2809* (2013.01)

(58) Field of Classification Search
USPC ........................................................ 709/223
See application file for complete search history.

(56) References Cited

U.S. PATENT DOCUMENTS

| | | | |
|---|---|---|---|
| 9,705,817 B2 * | 7/2017 | Lui | ......................... H04L 67/10 |
| 2007/0043860 A1 | 2/2007 | Pabari | |
| 2010/0275200 A1 | 10/2010 | Radhakrishnan et al. | |
| 2012/0089980 A1 * | 4/2012 | Sharp | .................. G06F 9/45558 718/1 |
| 2013/0080641 A1 | 3/2013 | Lui et al. | |
| 2014/0280799 A1 * | 9/2014 | Hendry | ................. G06F 15/177 709/221 |
| 2015/0026306 A1 * | 1/2015 | Moon | ..................... H04L 67/10 709/219 |
| 2016/0378535 A1 * | 12/2016 | Oh | ........................ G06F 9/4451 718/1 |

* cited by examiner

*Primary Examiner* — Anthony Mejia
(74) *Attorney, Agent, or Firm* — Finnegan, Henderson, Farabow, Garrett & Dunner, LLP (57) ABSTRACT

This disclosure relates to system and method for system and method for determining service prioritization in virtual desktop infrastructure (VDI). In one embodiment, the method comprises receiving the plurality of service requests from a plurality of virtual desktop (VD) components distributed across one or more VD sites, and, for each of the plurality of service requests, determining a user experience index for a service request based on a weightage tree for a VD component initiating the service request and a weightage of a VD site comprising the VD component initiating the service request. The method further comprises prioritizing the plurality of service requests based on the user experience index for each of the plurality of service requests.

20 Claims, 9 Drawing Sheets

SYSTEM AND METHOD FOR DETERMINING SERVICE PRIORITIZATION IN VIRTUAL DESKTOP INFRASTRUCTURE

TECHNICAL FIELD

This disclosure relates generally to virtual desktop infrastructure, and more particularly to system and method for determining service prioritization in virtual desktop infrastructure.

BACKGROUND

Virtual desktop infrastructure (VDI) is a practice of hosting a desktop system within a virtual machine (VM) running on a centralized server. VDI comprises a complex setup of multiple virtual desktop (VD) sites, each VD site comprising multiple layers and associated components. Each layer generates a lot of alerts and events, including those related to faults in the associated components. Various health monitoring systems at each layer capture these alerts and events, and raise them as service requests to central or global command center. At the global command center, many service requests are collected every minute from various VD sites.

At any typical global command center, service staff looks at these service requests, and works on fixing them. It is very challenging for the service staff to prioritize the alerts or service requests. Existing techniques perform prioritization based on standard parameters such as severity, availability, performance, and so forth. However, existing techniques are limited and many times misleading in performing prioritization. For example, existing techniques typically work in silo in the VDI environment and therefore fails to consider multiple layers and components, and collaboration among them. Additionally, existing techniques fail to account for impact on end user experience while prioritizing the service requests, and therefore fail to provide better end user experience. The end user experience may be ultimate goal for many VDI monitoring and management systems.

SUMMARY

In one embodiment, a method of determining a prioritization of a plurality of service requests in a virtual desktop infrastructure (VDI) is disclosed. In one example, the method comprises receiving the plurality of service requests from a plurality of virtual desktop (VD) components distributed across one or more VD sites. The method further comprises, for each of the plurality of service requests, determining a user experience index for a service request based on a weightage tree for a VD component initiating the service request and a weightage of a VD site comprising the VD component initiating the service request. The method further comprises prioritizing the plurality of service requests based on the user experience index for each of the plurality of service requests.

In one embodiment, a system for determining a prioritization of a plurality of service requests in a virtual desktop infrastructure (VDI) is disclosed. In one example, the system comprises at least one processor and a memory communicatively coupled to the at least one processor. The memory stores processor-executable instructions, which, on execution, cause the processor to receive the plurality of service requests from a plurality of virtual desktop (VD) components distributed across one or more VD sites. The processor-executable instructions, on execution, further cause the processor to, for each of the plurality of service requests, determine a user experience index for a service request based on a weightage tree for a VD component initiating the service request and a weightage of a VD site comprising the VD component initiating the service request. The processor-executable instructions, on execution, further cause the processor to prioritize the plurality of service requests based on the user experience index for each of the plurality of service requests.

In one embodiment, a non-transitory computer-readable medium storing computer-executable instructions for determining a prioritization of a plurality of service requests in a virtual desktop infrastructure (VDI) is disclosed. In one example, the stored instructions, when executed by a processor, cause the processor to perform operations comprising receiving the plurality of service requests from a plurality of virtual desktop (VD) components distributed across one or more VD sites. The operations further comprise, for each of the plurality of service requests, determining a user experience index for a service request based on a weightage tree for a VD component initiating the service request and a weightage of a VD site comprising the VD component initiating the service request. The operations further comprise prioritizing the plurality of service requests based on the user experience index for each of the plurality of service requests.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Figure 1:
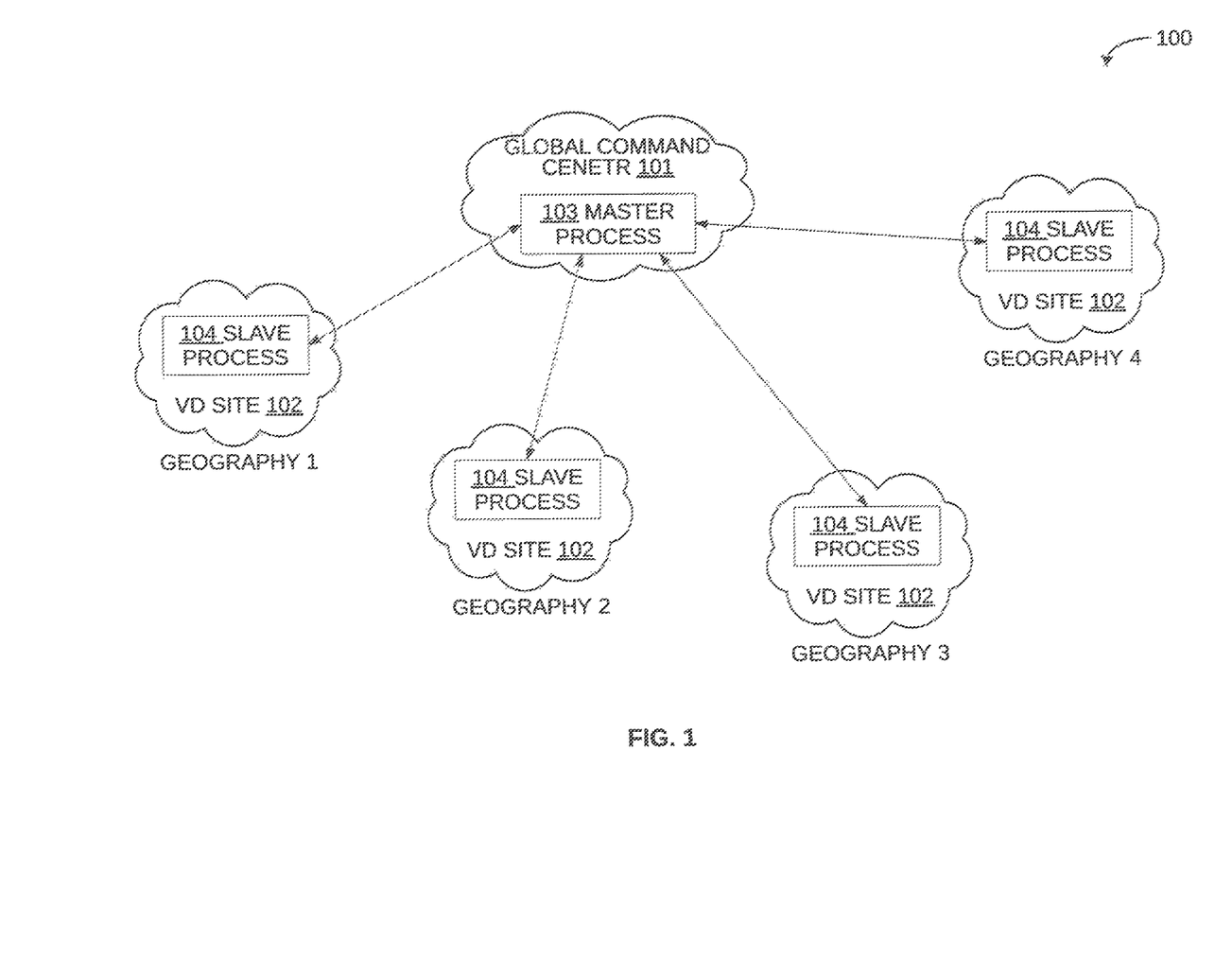
FIG. 1 illustrates an exemplary architecture of a virtual desktop infrastructure (VDI) in which various embodiments of the present disclosure may function in accordance with some embodiments of the present disclosure.

Referring now to FIG. 1, an exemplary architecture of a virtual desktop infrastructure (VDI) 100 is illustrated in accordance with some embodiments of the present disclosure and in which various embodiments of the present disclosure may function. The VDI 100 comprises a global command center (GCC) 101 and multiple virtual desktop (VD) sites 102. The VD sites 102 may be distributed geographically across the globe. Further, each VD site 102 may be independent of the other VD sites 102, and may provide virtual desktops to a plurality of users.

All the VD sites 102 are monitored and managed centrally by the GCC 101. The service and support staff is located at GCC 101. As will be described in greater detail in conjunction with FIG. 2, each VD site 102 comprises multiple layers and components. These layers and components generate alerts and events whenever errors or malfunctions occur. The VD sites 102 send these heath records to GCC 101. The staff at GCC 101 analyzes these alerts and events (also referred to as fault records, or service requests) and provide remedial solutions. For example, in some embodiment, the staff may remotely connect to one or more components of the VD site 102 and take remedial actions to resolve these alerts.

The VDI 100 may determine prioritization of the service requests in accordance with some embodiments of the present disclosure. In particular, the VDI 100 implements a VDI management and monitoring system and associated process for determining service prioritization. As will be described in greater detail in conjunction with FIGS. 3-8, the VDI management and monitoring system and the associated process comprises multiple modules configured to process service requests so as to determine prioritization of the service requests. The VDI management and monitoring system receives the plurality of service requests from a plurality of VD components distributed across one or more VD sites, and, for each of the plurality of service requests, determines a user experience index for a service request based on a weightage tree for a VD component initiating the service request and a weightage of a VD site comprising the VD component initiating the service request. The VDI management and monitoring system further prioritizes the plurality of service requests based on the user experience index for each of the plurality of service requests. The process associated with the VDI management and monitoring system may be distributed among a master process 103 and multiple slave processes 104. The master process 103 is implemented at the GCC 101 while the slave process 104 is implemented at each of the VD sites 102. The master process 103 is a single process that coordinates all the slave processes 104.

The master process 103 receives service requests, generates maps, and distributes the same to slave processes 104. The master process 103 further generates service request weightages tree model, and distributes the same to the slave processes 104 from time to time. Additionally, the master process 103 consolidates prioritized service requests from the slave processes 104, applies site level prioritization algorithm, and generates final sorted lists. Further, the master process 103 reports the final lists to the GCC staff. In some embodiments, the master process 103 evaluates weightages on a periodic basis, and applies adaptive algorithm to recalibrate weightages of the tree model. Additionally, in some embodiments, the master process 103 reports fault analytic reports to the GCC staff on demand, or on a periodic basis. Moreover, in some embodiments, the master process 103 provides user interface for the GCC staff for customization and management.

The slave process 104 gathers service requests from various layers and components of the corresponding VD site 102. The slave process 104 further executes the instructions as communicated by the master process 103 from time to time. Additionally, the slave process 104 sends raw data and algorithm results to the master process 103. Further, the slave process 104 stores fault history, and sends the same to the master process 103 on a periodic basis.

Figure 2:
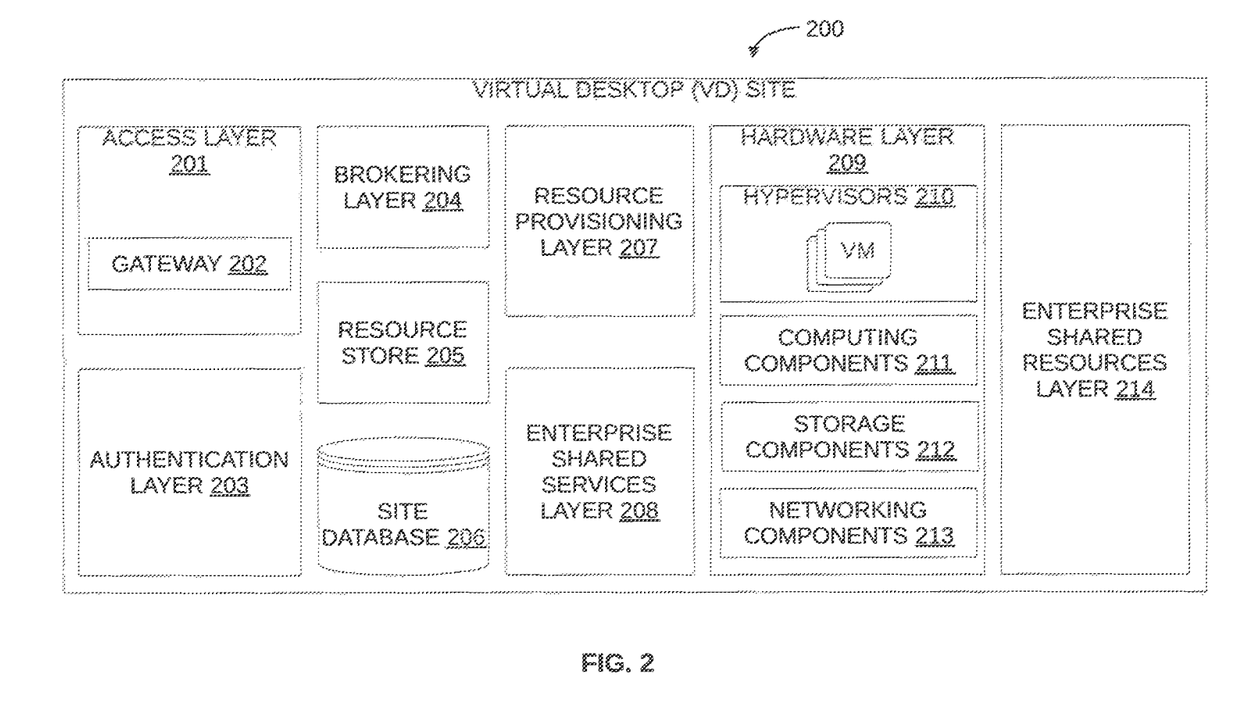
FIG. 2 is a functional block diagram of a virtual desktop (VD) site in accordance with some embodiments of the present disclosure.

Referring now to FIG. 2, a functional block diagram of a VD site 200, analogous to the VD site 102 implemented by the system 100 of FIG. 1, is illustrated in accordance with some embodiments of the present disclosure. The VD site 200 may include various layers. Each of the layer may further include one or more components. For example, the VD site 200 may include an access layer 201 that provides interface for the local and remote users to connect to the VD site 200. Typical components of the access layer 201 include, but are not limited to, gateways 202, and firewalls. The VD site 200 may also include an authentication layer 203 that provides for authentication of users. The access layer 201 may interact with the authentication layer 203 so as to allow the users to consume various resources and services of the VD site 200. The authentication layer 203 may include an active directory as a typical component.

The VD site 200 may further include a brokering layer 204 that identifies entitlements of each of the users, and enables the users to consume their respective entitlements. Typical components of the brokering layer 204 may include one or more desktop delivery engines. The VD site 200 may further include a resource store 205 that stores the users' entitlements records. As will be appreciated, the brokering layer 204 queries the resource store 205 to identify entitlements of each user. Typical components of the resource store 205 include, but are not limited to, desktop stores, and application stores. The VD site 200 may further include a site database 206 that may act as an infrastructure repository for the VD site 200. Typical components of the brokering layer 204 may include one or more database engines.

The VD site 200 may further include a resource provisioning layer 207 that provisions desktops and applications for the users using various engines. Typical components of the resource provisioning layer 207 may include one or more image management engines. The VD site 200 may further include an enterprise shared services layer 208 that is responsible for enterprise back end services. These back end services are typically integrated with the VD site 200. Typical components of the enterprise shared services layer 208 may include, but are not limited to, a dynamic host configuration protocol (DHCP), and a domain name server (DNS).

The VD site 200 may further include a physical infrastructure layer or a hardware layer 209. The hardware layer 209 provides for computing, storage, and networking. Typical components of the hardware layer 209 may include, but are not limited to, hypervisors 210 that creates and runs virtual machines (VM's), computing components 211 (e.g., servers, processors, etc.), storage components 212 (e.g., racks, hard disks, etc.), and networking components 213 (e.g., network switches, routers, etc.). Additionally, the VD site 200 may include an enterprise shared resources layer 214 that constitutes enterprise level resources such as shared storage. Typical components of the enterprise shared resources layer 214 may include, but are not limited to, network storages, user storages, and backup storages.

As will be appreciated by those skilled in the art, all such aforementioned layers may be represented as a single layer or a combination of different layers. Further, as will be appreciated by those skilled in the art, each of the layers may reside, in whole or in parts, on one device or multiple devices in communication with each other.

Further, as will be appreciated by one skilled in the art, a variety of processes may be employed for determining service prioritization in a VDI. For example, the exemplary VDI 100 may determine prioritization of service requests by the processes discussed herein. In particular, as will be appreciated by those of ordinary skill in the art, control logic and/or automated routines for performing the techniques and steps described herein may be implemented by the VDI 100, either by hardware, software, or combinations of hardware and software. For example, suitable code may be accessed and executed by the one or more processors on the VDI 100 to perform some or all of the techniques described herein. Similarly application specific integrated circuits (ASICs) configured to perform some or all of the processes described herein may be included in the one or more processors on the VDI 100.

Figure 3:
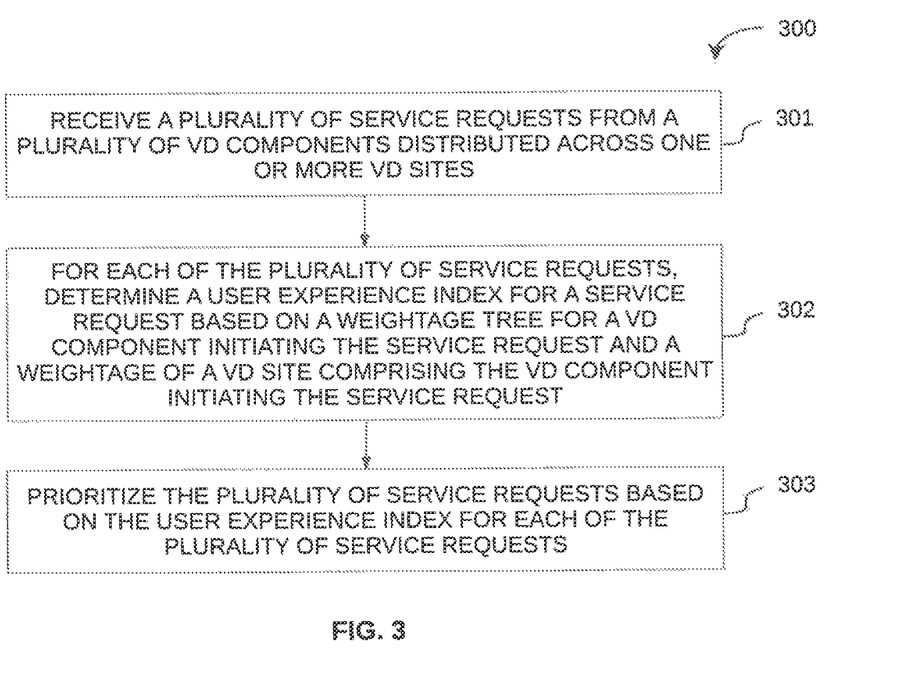
FIG. 3 is a flow diagram of an exemplary process for determining service prioritization in a VDI in accordance with some embodiments of the present disclosure.

For example, referring now to FIG. 3, exemplary control logic 300 for determining prioritization of service requests in a VDI, such as VDI 100, is depicted via a flowchart in accordance with some embodiments of the present disclosure. As illustrated in the flowchart, the control logic 300 includes the steps of receiving the plurality of service requests from a plurality of VD components distributed across one or more VD sites 102 at step 301, and, for each of the plurality of service requests, determining a user experience index (UXI) for a service request based on a weightage tree for a VD component initiating the service request and a weightage of a VD site 102 comprising the VD component initiating the service request at step 302. The control logic 300 includes the step of prioritizing the plurality of service requests based on the UXI for each of the plurality of service requests at step 303.

In some embodiments, the control logic 300 further includes the step of, for each of the plurality of VD components, identifying a plurality of parameters associated with a VD component, a plurality of dependent components for the VD component, and a plurality of redundant components for the VD component. Additionally, in some embodiments, the control logic 300 further includes the step of, for each of the plurality of VD components, determining a corresponding weightage for each of the plurality of parameters, the plurality of dependent components, and the plurality of redundant components. It should be noted that the plurality of parameters may include, but are not limited to, an availability, a performance, a criticality, and a security. Moreover, in some embodiments, the control logic 300 further includes the step of, for each of the plurality of VD components, building the weightage tree based on the plurality of parameters and corresponding weightages, the plurality of dependent components and corresponding weightages, and the plurality of redundant components and corresponding weightages. Further, in some embodiments, the control logic 300 includes the step of, for each of the plurality of VD components, identifying a change in each of the plurality of parameters, the plurality of dependent components, and the plurality of redundant components. In some embodiments, the control logic 300 further includes the step of, for each of the plurality of VD components, adaptively modifying the corresponding weightage for each of the plurality of parameters, the plurality of dependent components, and the plurality of redundant components based on the change.

In some embodiments, the weightage tree for the VD component is based on at least one of a plurality of available parallel paths, an impact on performance of other components, an overall impact on performance, a number of service requests in the path of the VD component, a nature of service degradation, and a number of impacted users. Additionally, in some embodiments, prioritizing the plurality of service requests at step 303 comprises sorting the plurality of service requests based on the UXI for each of the plurality of service requests.

In some embodiments, the control logic 300 further includes the step of, rendering the prioritization of the plurality of service requests to a service team. Additionally, in some embodiments, the control logic 300 further includes the step of, providing a recommended action for each of the plurality of service requests based on the prioritization. Moreover, in some embodiments, the control logic 300 further includes the steps of, for each of the plurality of service requests, receiving an actual user experience for the service request, determining a deviation by comparing the actual user experience with respect to corresponding UXI, and recalibrating a plurality of weightages of the weightage tree for the VD component initiating the service request based on the deviation.

Figure 4:
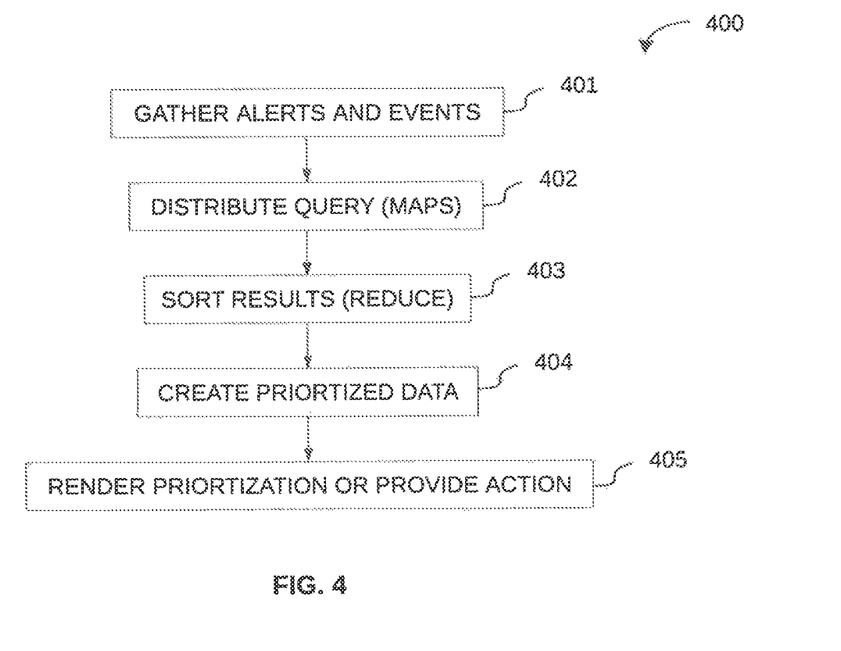
FIG. 4 is a flow diagram of a detailed exemplary process for determining service prioritization in a VDI in accordance with some embodiments of the present disclosure.

Referring now to FIG. 4, exemplary control logic 400 for determining prioritization of service requests in a VDI is depicted in greater detail via a flowchart in accordance with some embodiments of the present disclosure. As illustrated in the flowchart, at step 401, the control logic 400 gathers alerts and events (i.e., fault records or service requests) from each VD site 102. Thus, the service requests from each VD site 102 are collected centrally. At step 402, the control logic 400 determines, for each of the service requests, parameters (i.e., attributes), dependency components, redundant components, and their corresponding end user experience weightages (i.e., EUEXP weights) for the VD component initiating the service request. At step 403, the control logic 400 determines, for each of the service requests at each VD site 102, available dependency parameters (i.e., dependency attributes) for the VD component initiating the service request. The control logic 400 then computes the user experience index (UXI) for each of the service requests based on the weightage tree of the VD component initiating the service request. In other words, an impact of the service request on end user experience is determined. At step 404, the control logic 400 applies a VD site level weightage to each of the computed UXI corresponding to each of the service requests, and computes a final UXI for each of the service requests. The control logic 400 then consolidates all the service requests and sort them based on the UXI so as to determine prioritization. For example, in some embodiments, the prioritization may be based on a descending order of UXI. Thus, a service request having maximum impact on an end user or a group of users (i.e., highest UXI) has a highest priority, while that having a minimal impact (i.e., lowest UXI) has a lowest priority. Similarly, a service request having an impact on more number of users (i.e., higher UXI) has a higher priority, while that having an impact on limited number of users (i.e., lower UXI) has a lower priority. At step 405, the control logic 400 renders prioritization to GCC staff or an automated service request handling system. For example, the control logic 400 may present the final sorted list to the GCC staff. Further, in some embodiments, the control logic 400 may provide remedial action to the service request based on the prioritization.

As discussed above, UXI is a measure of impact of the service request on end users' experience. Thus, in some embodiments, higher the UXI, higher the number of impacted users experiencing degraded VD service and/or graver the nature of degraded VD service experience. A determination of UXI for each of the service requests, corresponding to each of the impacted or degraded VD services, provides an indication that which service request, from among the multiple service requests, causes more damage to the end user experience. The GCC staff may then prioritize remedial actions or services so as to address that service request, and work on other service requests in order of the UXI. The remedial actions or services will therefore be much more efficient and enhance the customer satisfaction, while minimizing any impact due to the degraded VD services. However, determining UXI's for service requests is not straightforward in virtual desktop environment. It is complex and depends on many other parameters, not only related to that component or device, but also related to other components or devices. This dependency matrix compounds the complexity of UXI determination.

By way of an example, if the VDI management and monitoring system receives an alert or a service request that indicates desktop delivery brokering service has stopped functioning. Traditionally, the severity of this alert is critical and therefore of high priority to the service team as the users' normal VD service requests may be denied, and all VD services become non-functional. However, in reality, this may not be the case. In most of the VD sites 102, many components are deployed in redundant. Hence, if one component stops functioning, other redundant component may take that load. Thus, actual impact to end users may be almost negligible.

By way of another example, if the VDI management and monitoring system receives an alert or a service request that indicates desktop delivery brokering service is running with less memory. Traditionally, the severity of this alert is medium and therefore of medium priority to service team (i.e., lower in comparison to earlier case). However, in reality, the impact may be higher than earlier case. In this case, the users' normal VD service requests may not be diverted to redundant brokering service through redundant component, as the original desktop delivery brokering service has not failed to function and the automatic failover mechanism has not kicked-in. The end users may continue to experience the slowness in processing of their normal VD service requests. Thus, the actual impact to end users (UXI) is higher in comparison to earlier case.

By way of yet another example, if the VDI management and monitoring system receives an alert or a service request that indicates desktop delivery brokering service (which is already running with less memory) stopped functioning. In this case, automatic failover mechanism kicks-in, and the users' normal service requests start getting diverted to redundant desktop delivery brokering service. As the other desktop delivery brokering service is fully operational without any service degradation (such as low memory that results in increased response time), end users will perceive better experience. In this case, the fault actually improves the end user experience which is completely contradictory to the traditional monitoring system reports.

Figure 5:
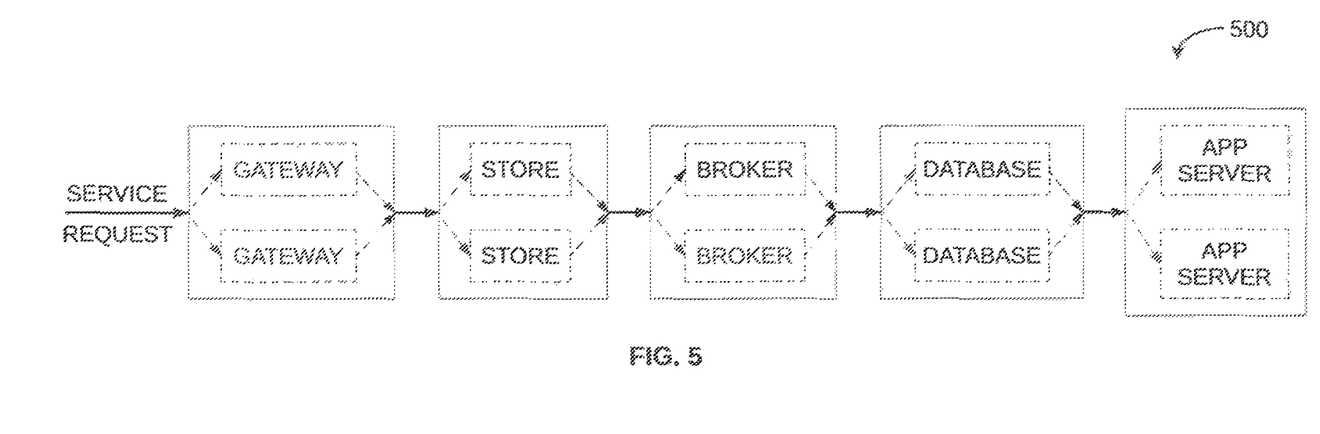
FIG. 5 illustrates multiple exemplary paths available for a normal VD service request in a typical VD site.

The above described examples for same device or service fault (i.e., desktop delivery brokering service) is a fairly simple one. In some embodiments, the UXI for a VD site fault typically depends on a path that user's normal VD service request passes through, and the devices or components performance placed in the path. Referring now to FIG. 5, multiple exemplary paths 500 available for a normal VD service request, such as for an application or a resource, in a typical VD site 102 is illustrated in accordance with some embodiments of the present disclosure. The normal VD service request may potentially traverse different combinations of the multiple available paths 500 in the typical VD site 102. For example, in the illustrated example, a normal VD service request may traverse through one or more gateways, one or more components of the resource store, one or more components of the brokering layer, one or more database engines, and one or more application server.

Thus, the UXI of a fault may be dependent on a variety of factors including, but not limited to, available parallel paths, an impact on performances of other devices or components, an overall impact (i.e., chained impact) on performance, a number of normal VD service requests in the path of the VD component, a nature of service degradation for a normal VD service request, and a number of impacted users. These factors are then taken into account to build the weightage tree for a VD component initiating the fault record.

Figure 6:
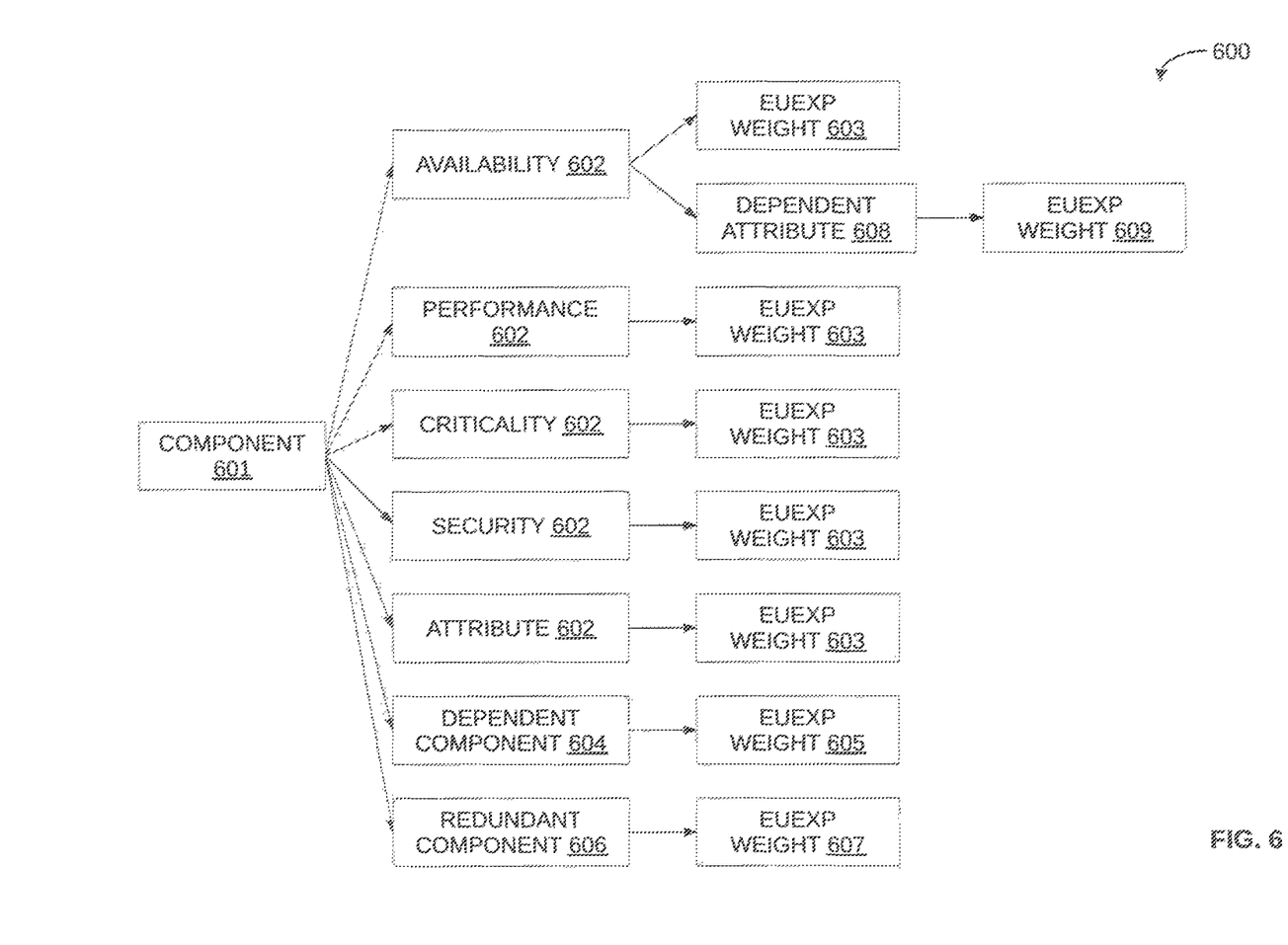
FIG. 6 illustrates an exemplary weightage tree for a VD component.

Referring now to FIG. 6, an exemplary user experience weightage tree 600 for a VD component 601 is illustrated in accordance with some embodiments of the present disclosure. As illustrated, the weightage tree 600 includes one or more parameters (e.g., attributes) 602 associated with the VD component 601 such as availability, performance, criticality, security, and so forth along with corresponding one or more end user experience weights (EUEXP weights) 603. The weightage tree 600 also includes one or more dependent components 604 along with corresponding one or more EUEXP weights 605, and one or more redundant components 606 along with corresponding one or more EUEXP weights 607 for the given VD component 601. Additionally, the weightage tree 600 includes one or more dependent parameters (e.g., attributes) 608 for each of the parameters 602 associated with the VD component 601 along with corresponding one or more EUEXP weights 609.

As will be appreciated, to build the weightage tree 600, the fault records or service requests are first categorized or bucketed into a pre-defined set of parameters for the VD component 601 such as attributes (e.g., availability, performance, etc). Additionally, dependent parameters 608 are identified for each of the parameters. Further, the dependent components 604 and redundant components 606 are identified for the VD component 601, and their availability and performance are measured. These parameters, dependent parameters, and components, are arranged in a tree, and EUEXP weight is allocated to each leaf. The fault record data may be fed to tree and the UXI may be determined.

Figure 7:
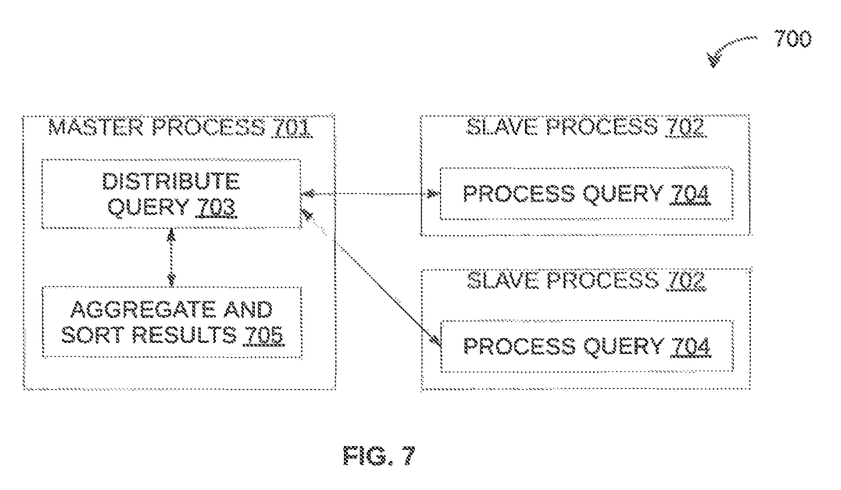
FIG. 7 illustrates distribution of exemplary process for determining service prioritization in a VDI among a master process and slave processes.

As stated above, the process for determining prioritization of the service requests based on their respective UXI's may be distributed among master process running at GCC and multiple slave processes running at VD sites 102. Referring now to FIG. 7, distribution of exemplary process for determining service prioritization among a master process and slave processes is illustrated in accordance with some embodiments of the present disclosure. As illustrated, the master process 701 running at GCC coordinates with the slave processes 702 running at each of the VD sites 102. The master process 701 executes distribute query sub-process 703 so as to provide input parameters and instructions to each of the slave processes 702. Each of the slave processes 702 execute process query sub-process 704 so as to process the fault records or service requests based on the input parameters and instructions received from the master process 701, and to send the results to the master process 701. The master process 701 then aggregates and sorts the results received from each of the slave processes 702 by executing aggregate and sort results sub-process 705.

By way of example, in some embodiments, the processes and the sub-processes described above along with their functions, corresponding actions, input parameters, and output parameters may be represented with the help of Table A below:

TABLE A

| Function(s) | Process Query/ Action(s) | Description | Input | Output |
|---|---|---|---|---|
| Distribute Query (Map) | Collect | Collect heath records | Trigger | Fault records |
| | Weight Tree | Identify weightage map of each fault record | Maps, Fault records | Weightage tree |
| Aggregate and Sort Results (Reduce) | Index | Calculate UXI of each fault record | Records, Weights | UXI for each record |
| | Sort | Prioritize and prepare sorted lists at each site level | Fault records | Sorted lists for each site |
| | Consolidate | Consolidate taking site weightage in to account and prepare final sorted list | Site sorted lists | Final sorted list |

By way of another example, in some embodiments, a sample list of fault records or service requests from across various VD sites 102 sorted based on user experience index (UXI) is provided in Table B below. The GCC staff provides remedial services and actions based on the prioritization of such list. As stated, the priority of each fault record or service request is set based on the UXI ranking order. Thus, the GCC remedial services and actions are prioritized for better end user experience.

TABLE B

| Priority Rank | UXI | VD Site | VD Component | Alert Level | Alert Text | Time Stamp |
|---|---|---|---|---|---|---|
| 1 | 400 | Site001 | HYPERVISOR014 | Warning | Low memory | 2016 Dec. 7 10:00 |
| 2 | 330 | Site002 | Gateway002 | Critical | Service failure | 2016 Dec. 7 11:00 |
| 3 | 200 | Site003 | VM015 | Information | SQL query took 2 minutes to execute | 2016 Dec. 7 10:12 |
| 4 | 150 | Site004 | DESKTOP067 | Warning | High latency | 2016 Dec. 7 10:31 |

As will be appreciated, the behavior of the VD site 102 is dynamic and changes over time. Thus, in some embodiments, the process for determining prioritization of the service requests may be adaptive in nature so as to identify and adapt to such dynamic changes. In other words, an adaptive learning algorithm may be built into the process to enable self-learning and self-correction mechanism to accommodate any changes over a period of time. In some embodiments, the adaptive learning algorithm may be executed at a regular time interval (i.e., on a periodic time basis), or upon measuring an error that has crept in the process.

Figure 8:
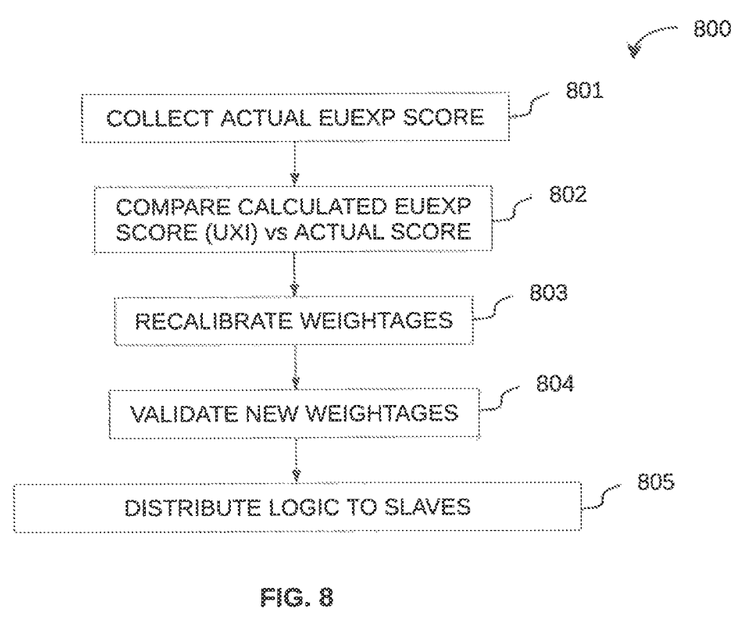
FIG. 8 is a flow diagram of an exemplary process for implementing adaptive learning for the process of determining service prioritization in a VDI in accordance with some embodiments of the present disclosure.

Referring now to FIG. 8, exemplary control logic 800 for implementing adaptive learning for the process of determining service prioritization in a VDI is depicted via a flowchart in accordance with some embodiments of the present disclosure. As illustrated in the flowchart, the control logic 800 includes the step of collecting an actual user experience score for the service request at step 801, comparing the actual user experience score with respect to corresponding user experience index (UXI) so as to determine a deviation (i.e., error that has crept in the process) at step 802, and recalibrating various weightages of the weightage tree for the VD component initiating the service request based on the deviation at step 803. It should be noted that recalibration of weightages involve re-identifying the parameters, dependent parameters, dependent components, redundant components, and their corresponding weights so as to keep logic up-to-date. The control logic 800 further includes the step of validating new weightages at step 804, and distributing the updated weightage tree to the slave processes 702 at step 805.

As will be also appreciated, the above described techniques may take the form of computer or controller implemented processes and apparatuses for practicing those processes. The disclosure can also be embodied in the form of computer program code containing instructions embodied in tangible media, such as floppy diskettes, solid state drives, CD-ROMs, hard drives, or any other computer-readable storage medium, wherein, when the computer program code is loaded into and executed by a computer or controller, the computer becomes an apparatus for practicing the invention. The disclosure may also be embodied in the form of computer program code or signal, for example, whether stored in a storage medium, loaded into and/or executed by a computer or controller, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

Figure 9:
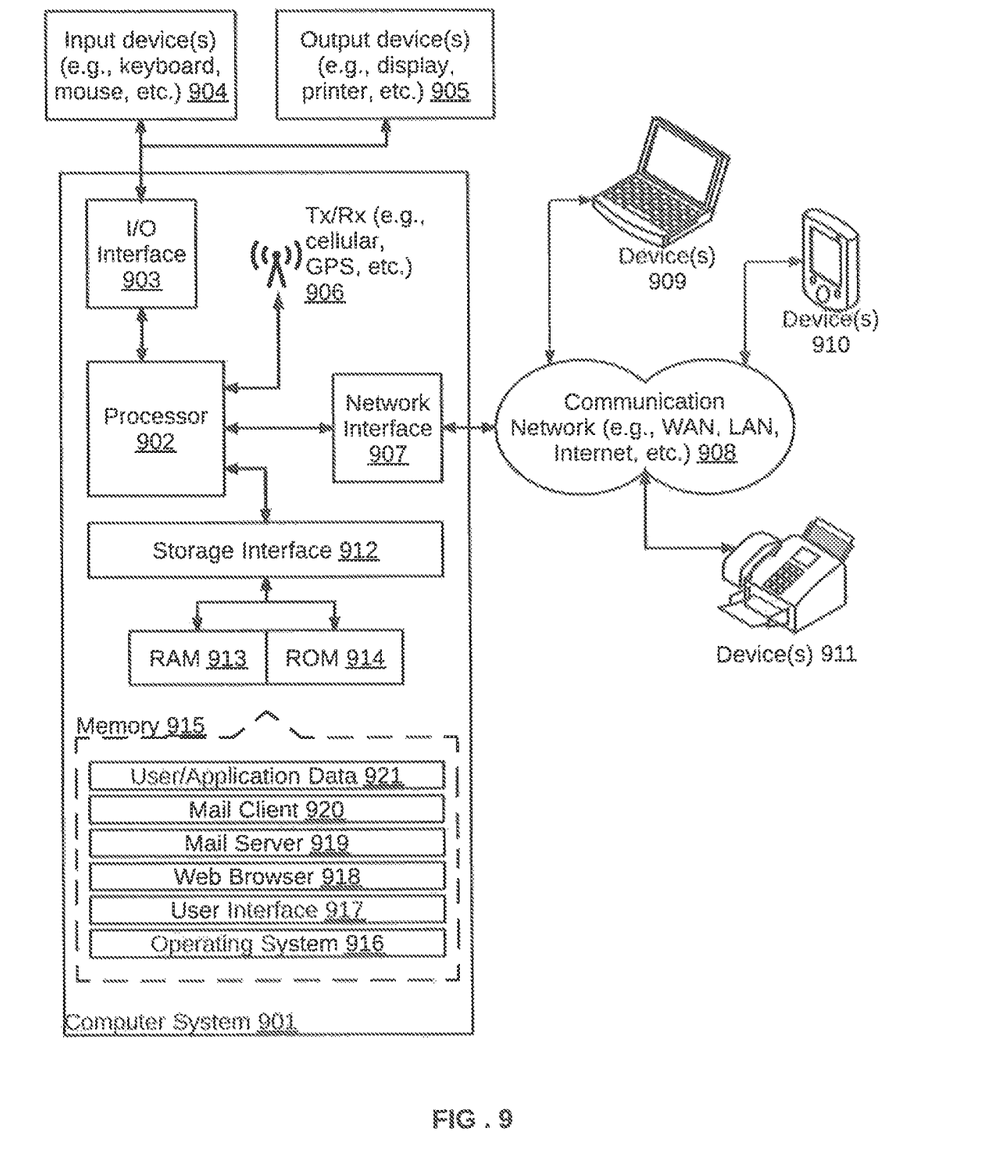
FIG. 9 is a block diagram of an exemplary computer system for implementing embodiments consistent with the present disclosure.

The disclosed methods and systems may be implemented on a conventional or a general-purpose computer system, such as a personal computer (PC) or server computer. Referring now to FIG. 9, a block diagram of an exemplary computer system 901 for implementing embodiments consistent with the present disclosure is illustrated. Variations of computer system 901 may be used for implementing VDI management and monitoring system 100 and process 300 and 400 for determining prioritization of service requests. Computer system 901 may comprise a central processing unit ("CPU" or "processor") 902. Processor 902 may comprise at least one data processor for executing program components for executing user- or system-generated requests. A user may include a person, a person using a device such as such as those included in this disclosure, or such a device itself. The processor may include specialized processing units such as integrated system (bus) controllers, memory management control units, floating point units, graphics processing units, digital signal processing units, etc. The processor may include a microprocessor, such as AMD Athlon, Duron or Opteron, ARM's application, embedded or secure processors, IBM PowerPC, Intel's Core, Itanium, Xeon, Celeron or other line of processors, etc. The processor 902 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 902 may be disposed in communication with one or more input/output (I/O) devices via I/O interface 903. The I/O interface 903 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 903, the computer system 901 may communicate with one or more I/O devices. For example, the input device 904 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, altimeter, gyroscope, proximity sensor, or the like), stylus, scanner, storage device, transceiver, video device/source, visors, etc. Output device 905 may be a printer, fax machine, video display (e.g., cathode ray tube (CRT), liquid crystal display (LCD), light-emitting diode (LED), plasma, or the like), audio speaker, etc. In some embodiments, a transceiver 906 may be disposed in connection with the processor 902. The transceiver may facilitate various types of wireless transmission or reception. For example, the transceiver may include an antenna operatively connected to a transceiver chip (e.g., Texas Instruments WiLink WL1283, Broadcom BCM4750IUB8, Infineon Technologies X-Gold 618-PMB9800, or the like), providing IEEE 802.11a/b/g/n, Bluetooth, FM, global positioning system (GPS), 2G/3G HSDPA/HSUPA communications, etc.

In some embodiments, the processor 902 may be disposed in communication with a communication network 908 via a network interface 907. The network interface 907 may communicate with the communication network 908. The network interface may employ connection protocols including, without limitation, direct connect, Ethernet (e.g., twisted pair 10/100/1000 Base T), transmission control protocol/internet protocol (TCP/IP), token ring, IEEE 802.11a/b/gln/x, etc. The communication network 908 may include, without limitation, a direct interconnection, local area network (LAN), wide area network (WAN), wireless network (e.g., using Wireless Application Protocol), the Internet, etc. Using the network interface 907 and the communication network 908, the computer system 901 may communicate with devices 909, 910, and 911. These devices may include, without limitation, personal computer(s), server(s), fax machines, printers, scanners, various mobile devices such as cellular telephones, smartphones (e.g., Apple iPhone, Blackberry, Android-based phones, etc.), tablet computers, eBook readers (Amazon Kindle, Nook, etc.), laptop computers, notebooks, gaming consoles (Microsoft Xbox, Nintendo DS, Sony PlayStation, etc.), or the like. In some embodiments, the computer system 901 may itself embody one or more of these devices.

In some embodiments, the processor 902 may be disposed in communication with one or more memory devices (e.g., RAM 913, ROM 914, etc.) via a storage interface 912. The storage interface may connect to memory devices including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc.

The memory devices may store a collection of program or database components, including, without limitation, an operating system 916, user interface application 917, web browser 918, mail server 919, mail client 920, user/application data 921 (e.g., any data variables or data records discussed in this disclosure), etc. The operating system 916 may facilitate resource management and operation of the computer system 901. Examples of operating systems include, without limitation, Apple Macintosh OS X, Unix, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), IBM OS/2, Microsoft Windows (XP, Vista/7/8, etc.), Apple iOS, Google Android, Blackberry OS, or the like. User interface 917 may facilitate display, execution, interaction, manipulation, or operation of program components through textual or graphical facilities. For example, user interfaces may provide computer interaction interface elements on a display system operatively connected to the computer system 901, such as cursors, icons, check boxes, menus, scrollers, windows, widgets, etc. Graphical user interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, Javascript, AJAX, HTML, Adobe Flash, etc.), or the like.

In some embodiments, the computer system 901 may implement a web browser 918 stored program component.

The web browser may be a hypertext viewing application, such as Microsoft Internet Explorer, Google Chrome, Mozilla Firefox, Apple Safari, etc. Secure web browsing may be provided using HTTPS (secure hypertext transport protocol), secure sockets layer (SSL), Transport Layer Security (TLS), etc. Web browsers may utilize facilities such as AJAX, DHTML, Adobe Flash, JavaScript, Java, application programming interfaces (APIs), etc. In some embodiments, the computer system 901 may implement a mail server 919 stored program component. The mail server may be an Internet mail server such as Microsoft Exchange, or the like. The mail server may utilize facilities such as ASP, ActiveX, ANSI C++/C#, Microsoft .NET, CGI scripts, Java, JavaScript, PERL, PHP, Python, WebObjects, etc. The mail server may utilize communication protocols such as internet message access protocol (IMAP), messaging application programming interface (MAPI), Microsoft Exchange, post office protocol (POP), simple mail transfer protocol (SMTP), or the like. In some embodiments, the computer system 901 may implement a mail client 920 stored program component. The mail client may be a mail viewing application, such as Apple Mail, Microsoft Entourage, Microsoft Outlook, Mozilla Thunderbird, etc.

In some embodiments, computer system 901 may store user/application data 921, such as the data, variables, records, etc. (e.g., service requests, weightage tree, parameters associated with VD components and corresponding weightages, dependent parameters and corresponding weightages, dependent and redundant components for VD components and corresponding weightages, UXI's, and so forth) as described in this disclosure. Such databases may be implemented as fault-tolerant, relational, scalable, secure databases such as Oracle or Sybase. Alternatively, such databases may be implemented using standardized data structures, such as an array, hash, linked list, struct, structured text file (e.g., XML), table, or as object-oriented databases (e.g., using ObjectStore, Poet, Zope, etc.). Such databases may be consolidated or distributed, sometimes among the various computer systems discussed above in this disclosure. It is to be understood that the structure and operation of the any computer or database component may be combined, consolidated, or distributed in any working combination.

As will be appreciated by those skilled in the art, the techniques described in the various embodiments discussed above provide for determining prioritization of alerts and event (i.e., fault records or service requests) in virtual desktop infrastructure. The techniques provide for prioritization of fault records based on user experience index (UXI) so as to provide better end user experience while performing fault management (i.e., handling alerts and events).

In other words, the techniques described in the various embodiments discussed above provides for a VDI service health model based on end user experience. In some embodiments, many aspects of VD sites 102 such as redundant routes, resource usage, user profiles, application estate and requirements may be captured from each of the VD sites 102 at different times and at different loading levels. Based on these historical data, weightages for each site component and each parameter may be determined. The techniques then employ the model that analyses the events and alerts stream (i.e., fault records, or service requests) based on such weightages to determine their impact on end users, and generates ranking for each alert/event based on their impact. The service personal prioritizes the service requests based on the ranking so generated.

Additionally, the VDI consist of various layers such as access layer 201, control layer, brokering layer 204, resource layer 205, and hardware layer 209. Many different components may be rolled out at each layer from time to time. All these devices and components seamlessly integrate so as to provide for VD services. The techniques described in the various embodiments discussed above takes in to account the sensitivity of each layer and accordingly prepares the user experience dependency model. Further, the techniques described in the various embodiments discussed above provide for distributed processing and adaptive learning. The model learns and self-adjusts the parameters and weightages based on historical data and changes, as well as based on actual end user experience.

The specification has described system and method for determining prioritization of service requests in virtual desktop infrastructure. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method of determining a prioritization of a plurality of service requests in a virtual desktop infrastructure (VDI), the method comprising:

receiving, by a VDI management and monitoring system, the plurality of service requests from a plurality of virtual desktop (VD) components distributed across one or more VD sites, wherein a service request of the plurality of service requests comprises of alerts and events pertaining to a fault in the VDI;

for each of the plurality of service requests, determining, by the VDI management and monitoring system, a user experience index for a service request based on a weightage tree for a VD component initiating the service request and a weightage of a VD site comprising the VD component initiating the service request; and prioritizing, by the VDI management and monitoring system, the plurality of service requests based on the user experience index for each of the plurality of service requests.

2. The method of claim 1, further comprising, for each of the plurality of VD components:
identifying a plurality of parameters associated with a VD component, a plurality of dependent components for the VD component, and a plurality of redundant components for the VD component; and
determining a corresponding weightage for each of the plurality of parameters, the plurality of dependent components, and the plurality of redundant components.

3. The method of claim 2, wherein each of the plurality of parameters comprises at least one of an availability, a performance, a criticality, or a security.

4. The method of claim 2, further comprising, for each of the plurality of VD components, building the weightage tree based on the plurality of parameters and corresponding weightages, the plurality of dependent components and corresponding weightages, and the plurality of redundant components and corresponding weightages.

5. The method of claim 2, further comprising, for each of the plurality of VD components:
identifying a change in each of the plurality of parameters, the plurality of dependent components, and the plurality of redundant components; and
adaptively modifying the corresponding weightage for each of the plurality of parameters, the plurality of dependent components, and the plurality of redundant components based on the change.

6. The method of claim 1, wherein the weightage tree for the VD component is based on at least one of a plurality of available parallel paths, an impact on performances of other components, an overall impact on performance, a number of service requests in the path of the VD component, a nature of service degradation, and a number of impacted users.

7. The method of claim 1, wherein prioritizing the plurality of service requests comprises sorting the plurality of service requests based on the user experience index for each of the plurality of service requests.

8. The method of claim 1, further comprising, at least one of:
rendering the prioritization of the plurality of service requests to a service team; or
providing a recommended action for each of the plurality of service requests based on the prioritization.

9. The method of claim 1, further comprising, for each of the plurality of service requests:
receiving an actual user experience for the service request;
determining a deviation by comparing the actual user experience with respect to corresponding user experience index; and
recalibrating a plurality of weightages of the weightage tree for the VD component initiating the service request based on the deviation.

10. A system for determining a prioritization of a plurality of service requests in a virtual desktop infrastructure (VDI), the system comprising:
at least one processor; and
a memory for storing instructions that, when executed by the at least one processor, cause the at least one processor to perform operations comprising:
receiving the plurality of service requests from a plurality of virtual desktop (VD) components distributed across one or more VD sites, wherein a service request of the plurality of service requests comprises of alerts and events pertaining to a fault in the VDI;
for each of the plurality of service requests, determining a user experience index for a service request based on a weightage tree for a VD component initiating the service request and a weightage of a VD site comprising the VD component initiating the service request; and
prioritizing the plurality of service requests based on the user experience index for each of the plurality of service requests.

11. The system of claim 10, wherein the operations further comprise, for each of the plurality of VD components:
identifying a plurality of parameters associated with a VD component, a plurality of dependent components for the VD component, and a plurality of redundant components for the VD component;
determining a corresponding weightage for each of the plurality of parameters, the plurality of dependent components, and the plurality of redundant components; and
building the weightage tree based on the plurality of parameters and corresponding weightages, the plurality of dependent components and corresponding weightages, and the plurality of redundant components and corresponding weightages.

12. The system of claim 11, wherein the operations further comprise, for each of the plurality of VD components:
identifying a change in each of the plurality of parameters, the plurality of dependent components, and the plurality of redundant components; and
adaptively modifying the corresponding weightage for each of the plurality of parameters, the plurality of dependent components, and the plurality of redundant components based on the change.

13. The system of claim 10, wherein the weightage tree for the VD component is based on at least one of a plurality of available parallel paths, an impact on performances of other components, an overall impact on performance, a number of service requests in the path of the VD component, a nature of service degradation, and a number of impacted users.

14. The system of claim 10, wherein prioritizing the plurality of service requests comprises sorting the plurality of service requests based on the user experience index for each of the plurality of service requests.

15. The system of claim 10, wherein the operations further comprise, at least one of:
rendering the prioritization of the plurality of service requests to a service team; or
providing a recommended action for each of the plurality of service requests based on the prioritization.

16. The system of claim 10, wherein the operations further comprise, for each of the plurality of service requests:
receiving an actual user experience for the service request;
determining a deviation by comparing the actual user experience with respect to corresponding user experience index; and
recalibrating a plurality of weightages of the weightage tree for the VD component initiating the service request based on the deviation.

17. A non-transitory computer-readable medium storing instructions for determining a prioritization of a plurality of service requests in a virtual desktop infrastructure (VDI), wherein upon execution of the instructions by one or more processors, the processors perform operations comprising:

receiving the plurality of service requests from a plurality of virtual desktop (VD) components distributed across one or more VD sites, wherein a service request of the plurality of service requests comprises of alerts and events pertaining to a fault in the VDI;

for each of the plurality of service requests, determining a user experience index for a service request based on a weightage tree for a VD component initiating the service request and a weightage of a VD site comprising the VD component initiating the service request; and prioritizing the plurality of service requests based on the user experience index for each of the plurality of service requests.

18. The non-transitory computer-readable medium of claim 17, wherein the operations further comprise, for each of the plurality of VD components:

identifying a plurality of parameters associated with a VD component, a plurality of dependent components for the VD component, and a plurality of redundant components for the VD component;

determining a corresponding weightage for each of the plurality of parameters, the plurality of dependent components, and the plurality of redundant components; and building the weightage tree based on the plurality of parameters and corresponding weightages, the plurality of dependent components and corresponding weightages, and the plurality of redundant components and corresponding weightages.

19. The non-transitory computer-readable medium of claim 18, wherein the operations further comprise, for each of the plurality of VD components:

identifying a change in each of the plurality of parameters, the plurality of dependent components, and the plurality of redundant components; and adaptively modifying the corresponding weightage for each of the plurality of parameters, the plurality of dependent components, and the plurality of redundant components based on the change.

20. The non-transitory computer-readable medium of claim 17, wherein the operations further comprise, for each of the plurality of service requests:

receiving an actual user experience for the service request;

determining a deviation by comparing the actual user experience with respect to corresponding user experience index; and recalibrating a plurality of weightages of the weightage tree for the VD component initiating the service request based on the deviation.

* * * * *